US008867859B1

(12) United States Patent
Kwatra et al.

(10) Patent No.: US 8,867,859 B1

(45) **Date of Patent: *Oct. 21, 2014**

(54) ILLUMINATION ESTIMATION FOR IMAGES

(75) Inventors: Vivek Kwatra, Santa Clara, CA (US); Mei Han, Palo Alto, CA (US); Shengyang Dai, Evanston, IL (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,479

(22) Filed: Sep. 11, 2012

Related U.S. Application Data

(63) Continuation of application No. 12/431,629, filed on Apr. 28, 2009, now Pat. No. 8,391,634.

(51) Int. Cl.
*G06K 9/40* (2006.01)

(52) U.S. Cl.
USPC ............................ 382/274; 382/254; 382/151

(58) Field of Classification Search
CPC ....................................................... G06T 5/008
USPC ......................................... 382/144–145, 151
See application file for complete search history.

(56) References Cited

U.S. PATENT DOCUMENTS

| | | | | | |
|---|---|---|---|---|---|
| 5,003,618 | A * | 3/1991 | Meno | | 382/261 |
| 5,081,656 | A * | 1/1992 | Baker et al. | | 378/21 |
| 5,235,434 | A * | 8/1993 | Wober | | 358/448 |
| 5,455,870 | A * | 10/1995 | Sepai et al. | | 382/147 |
| 5,497,430 | A | 3/1996 | Sadovnik et al. | | |
| 5,537,669 | A * | 7/1996 | Evans et al. | | 382/141 |
| 5,761,329 | A | 6/1998 | Chen et al. | | |
| 5,841,129 | A | 11/1998 | Bacsa | | |
| 6,005,247 | A * | 12/1999 | Baum | | 250/310 |
| 6,016,196 | A | 1/2000 | Mermelstein | | |
| 6,055,097 | A | 4/2000 | Lanni et al. | | |
| 6,091,846 | A * | 7/2000 | Lin et al. | | 382/145 |
| 6,205,239 | B1 * | 3/2001 | Lin et al. | | 382/149 |
| 6,240,423 | B1 | 5/2001 | Hirata | | |
| 6,246,788 | B1 * | 6/2001 | Pattikonda et al. | | 382/147 |
| 6,249,601 | B1 * | 6/2001 | Kim et al. | | 382/162 |
| 6,253,173 | B1 | 6/2001 | Ma | | |
| 6,255,642 | B1 | 7/2001 | Cragg et al. | | |
| 6,269,179 | B1 * | 7/2001 | Vachtsevanos et al. | | 382/149 |
| 6,292,582 | B1 * | 9/2001 | Lin et al. | | 382/149 |
| 6,459,821 | B1 * | 10/2002 | Cullen | | 382/294 |
| 6,477,275 | B1 * | 11/2002 | Melikian et al. | | 382/217 |
| 6,483,938 | B1 * | 11/2002 | Hennessey et al. | | 382/149 |
| 6,516,085 | B1 * | 2/2003 | Wiley et al. | | 382/144 |
| 6,587,581 | B1 * | 7/2003 | Tanaka et al. | | 382/149 |
| 6,665,432 | B1 * | 12/2003 | Evans et al. | | 382/141 |
| 6,674,890 | B2 * | 1/2004 | Maeda et al. | | 382/149 |
| 6,701,026 | B1 * | 3/2004 | Zheng et al. | | 382/274 |

(Continued)

OTHER PUBLICATIONS

Fredembach C., Finlayson G. D.; Simple shadow removal. In Proc. ICPR (2006), vol. I, pp. 832-835.*

(Continued)

*Primary Examiner* — Gandhi Thirugnanam

(74) *Attorney, Agent, or Firm* — Fenwick & West LLP

(57) ABSTRACT

An image comprising varying illumination is selected. Instances of a repeating pattern in the image is determined. Illumination values for pixels at locations within instances of the repeating pattern are calculated responsive to pixel intensities of pixels at corresponding locations in other instances of the repeating pattern. The varying illumination is removed form the image responsive to the illumination values.

17 Claims, 7 Drawing Sheets

(56) References Cited

U.S. PATENT DOCUMENTS

| | | | | |
|---|---|---|---|---|
| 6,766,047 | B2 * | 7/2004 | Muraki et al. | 382/149 |
| 7,006,671 | B2 | 2/2006 | Yamaguchi | |
| 7,126,137 | B2 | 10/2006 | Singer et al. | |
| 7,272,241 | B2 | 9/2007 | Demi et al. | |
| 7,295,324 | B2 | 11/2007 | Jones et al. | |
| 7,315,642 | B2 * | 1/2008 | Bartov | 382/145 |
| 7,340,109 | B2 * | 3/2008 | Steinberg et al. | 382/275 |
| 7,358,994 | B2 * | 4/2008 | Yano | 348/254 |
| 7,366,323 | B1 * | 4/2008 | Yao et al. | 382/103 |
| 7,376,251 | B2 * | 5/2008 | Stober | 382/112 |
| 7,388,979 | B2 * | 6/2008 | Sakai et al. | 382/149 |
| 7,440,637 | B2 | 10/2008 | Schechner et al. | |
| 7,445,344 | B2 | 11/2008 | Lang et al. | |
| 7,447,338 | B2 | 11/2008 | Kim | |
| 7,577,313 | B1 * | 8/2009 | Georgiev | 382/284 |
| 7,653,491 | B2 | 1/2010 | Schadt et al. | |
| 7,668,787 | B2 | 2/2010 | Bier | |
| 7,697,746 | B2 * | 4/2010 | Kawaguchi | 382/149 |
| 7,706,599 | B2 | 4/2010 | Sim | |
| 7,706,603 | B2 | 4/2010 | Najafi et al. | |
| 7,783,102 | B2 * | 8/2010 | Kawaragi | 382/145 |
| 7,801,335 | B2 | 9/2010 | Hanna et al. | |
| 7,803,633 | B2 | 9/2010 | Spivey et al. | |
| 7,876,974 | B2 | 1/2011 | Brajovic | |
| 7,957,565 | B1 | 6/2011 | Sharma et al. | |
| 8,001,157 | B2 | 8/2011 | Bier | |
| 8,005,292 | B2 * | 8/2011 | Sakai et al. | 382/149 |
| 8,023,742 | B2 | 9/2011 | Brown et al. | |
| 8,139,883 | B2 | 3/2012 | Zhang et al. | |
| 8,175,376 | B2 | 5/2012 | Marchesotti et al. | |
| 8,260,008 | B2 | 9/2012 | Hanna et al. | |
| 8,345,940 | B2 | 1/2013 | Mattiuzzi et al. | |
| 8,369,579 | B2 | 2/2013 | Frigerio | |
| 8,369,608 | B2 | 2/2013 | Gunaratne | |
| 8,384,806 | B2 | 2/2013 | Robinson et al. | |
| 8,391,634 | B1 * | 3/2013 | Kwatra et al. | 382/274 |
| 8,396,325 | B1 * | 3/2013 | Kwatra et al. | 382/284 |
| 2003/0016881 | A1 * | 1/2003 | Matsuura | 382/274 |
| 2003/0142860 | A1 * | 7/2003 | Glasser et al. | 382/144 |
| 2003/0169906 | A1 | 9/2003 | Gokturk et al. | |
| 2004/0032979 | A1 * | 2/2004 | Honda et al. | 382/145 |
| 2004/0139067 | A1 | 7/2004 | Houle | |
| 2004/0202361 | A1 * | 10/2004 | Evans et al. | 382/141 |
| 2005/0100209 | A1 | 5/2005 | Lewis et al. | |
| 2005/0104974 | A1 * | 5/2005 | Watanabe et al. | 348/222.1 |
| 2005/0141002 | A1 * | 6/2005 | Takano et al. | 358/1.9 |
| 2005/0163397 | A1 * | 7/2005 | Baldwin | 382/275 |
| 2005/0179910 | A1 * | 8/2005 | Bartov | 356/503 |
| 2005/0238198 | A1 | 10/2005 | Brown et al. | |
| 2006/0018539 | A1 * | 1/2006 | Sato et al. | 382/173 |
| 2006/0034540 | A1 * | 2/2006 | Zavadsky et al. | 382/274 |
| 2006/0082849 | A1 * | 4/2006 | Kaku | 358/537 |
| 2006/0188113 | A1 | 8/2006 | Tice et al. | |
| 2006/0215882 | A1 * | 9/2006 | Ando et al. | 382/106 |
| 2006/0233423 | A1 | 10/2006 | Najafi et al. | |
| 2007/0104389 | A1 * | 5/2007 | Wells | 382/274 |
| 2007/0140556 | A1 | 6/2007 | Willamowski et al. | |
| 2007/0248282 | A1 * | 10/2007 | Suzuki | 382/282 |
| 2007/0282935 | A1 | 12/2007 | Khan et al. | |
| 2007/0286523 | A1 * | 12/2007 | Kim et al. | 382/274 |
| 2008/0025635 | A1 * | 1/2008 | Han et al. | 382/274 |
| 2008/0253681 | A1 * | 10/2008 | Chesnokov | 382/274 |
| 2008/0260274 | A1 | 10/2008 | Winder et al. | |
| 2009/0003725 | A1 * | 1/2009 | Merkel et al. | 382/274 |
| 2009/0252428 | A1 | 10/2009 | Winder | |
| 2010/0008581 | A1 | 1/2010 | Bressan | |
| 2010/0013965 | A1 * | 1/2010 | Pugh et al. | 348/254 |
| 2010/0040285 | A1 | 2/2010 | Csurka et al. | |
| 2010/0080472 | A1 | 4/2010 | Asano | |
| 2010/0191722 | A1 | 7/2010 | Boiman et al. | |
| 2010/0272357 | A1 * | 10/2010 | Maxwell et al. | 382/173 |
| 2011/0035035 | A1 | 2/2011 | Khan et al. | |
| 2011/0202528 | A1 | 8/2011 | Deolalikar et al. | |
| 2011/0286628 | A1 | 11/2011 | Goncalves et al. | |
| 2011/0297369 | A1 | 12/2011 | Kumaran et al. | |
| 2011/0304729 | A1 * | 12/2011 | Arcaini et al. | 348/143 |
| 2011/0311129 | A1 | 12/2011 | Milanfar et al. | |
| 2012/0020546 | A1 * | 1/2012 | Inoue et al. | 382/145 |
| 2012/0045134 | A1 | 2/2012 | Perronnin et al. | |
| 2012/0099796 | A1 | 4/2012 | Zitnick | |
| 2012/0141044 | A1 * | 6/2012 | Kwatra et al. | 382/274 |
| 2012/0281923 | A1 | 11/2012 | Irani et al. | |
| 2013/0051685 | A1 | 2/2013 | Shechtman et al. | |
| 2013/0156315 | A1 * | 6/2013 | Friedhoff et al. | 382/173 |
| 2013/0182909 | A1 | 7/2013 | Rodriguez-Serrano | |

OTHER PUBLICATIONS

Zhou W. et al., "Object-based land cover classification of shaded areas in high spatial resolution imagery of urban areas: A comparison study", 2009, Remote Sensing of Environment, vol. 113, p. 1769-1777.*

Weiss, Y., "Deriving Intrinsic Images from image sequences", 2001, Computer Vision, 2001. ICCV 2001. Proceedings. Eighth IEEE International Conference on, vol. 2, p. 68-75.*

Suzuki, A. "Dynamic Shadow Compensation of Aerial Images Based on Color and Spatial Analysis", 2000, Pattern Recognition, 2000. Proceedings. 15th International Conference on, vol. 1, p. 317-320.*

Tsai, V., "A Comperative Study on Shadow Compensation of Color Aerial Images in Invariant Color Models", 2006, IEEE Transactions on Geoscience and Remote Sensing, vol. 44, No. 6, p. 1661-1671.*

Salvador, E., "Cast shadow segmentation using invariant color features", 2004, Computer Vision and Image Understanding, p. 238-259.*

Polidorio, A.M., "Automatic shadow segmentation in aerial color images ", 2003, Computer Graphics and Image Processing, 2003. SIBGRAPI 2003. XVI Brazilian Symposium on, p. 270-277.*

Liu, F., "Texture-Consistent Shadow Removal", 2008, Computer Vision—ECCV 2008, p. 437-450.*

Yan Li, Tadashi Sasagawa and Peng Gong,2004. A System of the Shadow Detection and Shadow Removal for High Resolution City Aerial Photo. ISPRS, Commission ?, Istanbul.*

Li, Y., "Integrated shadow removal based on photogrammetry and image analysis", 2005, International Journal of Remote Sensing, Sensing, vol. 26, No. 18, p. 3911-3929.*

Huang, Jianjun, et al., "Detection of and Compensation for Shadows in Colored Urban Aerial Images", 2004, Proceedings of the 5th World Congress on Intelligent Control and Automation, p. 3098-3100.*

Berbar, M.A, "Clouds and shadows detection and removing from remote sensing images", 2004, Electrical, Electronic and Computer Engineering, 2004. ICEEC '04. 2004 International Conference on, p. 75-79.*

Dare, P, "Shadow Analysis in High-Resolution Satellite Imagery of Urban Areas", Photogrammetric Engineering & Remote Sensing, Feb. 2005, p. 169-177.*

Arbel, E. et al., "Texture-Preserving Shadow Removal in Color Images Containing Curved Surfaces", 2007, Computer Vision and Pattern Recognition—CVPR, p. 1-8.*

Kwatra, V. et al., "Shadow Removal for Aerial Imagery by Information Theoretic Intrinsic Image Analysis", 2012,International Conference on Computational Photography, p. 1-8.*

Ma, H., "Shadow Segmentation and Compensation in High Resolution Satellite Images", 2008, Geoscience and Remote Sensing Symposium, 2008. IGARSS 2008. IEEE International, p. 1036-1039.*

Scanlan, J.M. "A shadow detection and removal algorithm for 2-D images", 1990, Acoustics, Speech, and Signal Processing, 1990. ICASSP-90., 1990 International Conference on, p. 2057-2060.*

Baker, S., et al., "Limits on Super-Resolution and How to Break Them," IEEE Trans. Pattern Analysis and Machine Intelligence, 2002, pp. 1-37, vol. 24, No. 9.

(56) References Cited

OTHER PUBLICATIONS

Bouveyron, C., et al., “Dimension Reduction and Classification Methods for Object Recognition in Vision,” $5^{th}$ French-Danish Workshop on Spatial Statistics and Image Analysis in Biology, 2004, pp. 1-4.

Kim, K.I., et al., “Example-Based Learning for Single-Image Super Resolution,” Proc. DAGM, 2008, pp. 456-465.

Li, X., et al., “Example-based image super-resolution with class-specific predictors,” Journal Vis. Commun. Image R, 2009, pp. 312-322, vol. 20.

Liang, L., et al., “Real-Time Texture Synthesis by Patch-Based Sampling,” ACM Transactions on Graphics, Jul. 2001, pp. 127-150, vol. 20, No. 3.

* cited by examiner

ILLUMINATION ESTIMATION FOR IMAGES

CROSS-REFERENCE TO RELATED APPLICATIONS

This application is a continuation of U.S. patent application Ser. No. 12/431,629, filed on Apr. 28, 2009, which is incorporated by reference in its entirety.

BACKGROUND

1. Field of Art

The present invention generally relates to the field of digital image processing, and more specifically, to methods of estimating illuminations in images.

2. Background of the Invention

Many current information systems store large quantities of digital images, such as map applications that provide views of the surrounding area for a given map location. However, many of these images include undesirable characteristics such as uneven ambient illumination that degrade the content of the images. For example, some map systems contain many images of buildings, sometimes obtained from multiple sources. Typically, these images vary in image quality depending on the location of where the image was taken or the time of day that the image was captured. Such images may include an uneven illumination caused by neighboring buildings or illumination effects caused by window reflections. The presence of the uneven illumination in the images thereby results in undesirable characteristics due to the lack of uniformity of color intensity in the images. As a result, these systems provide users with images of less than desirable quality.

SUMMARY

The problems described above are met by a computer-implemented method, a computer program product and a computer system for removing illumination variation from an image. One embodiment of the computer-implemented method comprises selecting an image containing a varying illumination. Instances of a repeating pattern in the image are determined. The computer-implemented method further calculates illumination values for pixels at locations within instances of the repeating pattern responsive to pixel intensities of pixels at corresponding locations in other instances of the repeating pattern. The varying illumination is removed from the image responsive to the calculation of the illumination values.

Embodiments of the computer program product have a computer-readable storage medium storing computer-executable code for removing illumination variation from an image. The code comprises a period determination configured to select an image containing varying illumination and determine instances of a repeating pattern in the image. The code further comprises an optimization module configured to calculate illumination values for pixels at locations within instances of the repeating pattern responsive to pixel intensities of pixels at corresponding locations in other instances of the repeating pattern. The code further comprises an image enhancement module configured to remove the illumination variation from the image responsive to the calculation of the illumination values.

Embodiments of the computer-implemented system for removing an illumination variation from an image comprises a computer processor and a computer-readable storage medium storing computer program modules configured to execute on the computer processor. The computer program modules comprise a period determination configured to select an image containing varying illumination and determine instances of a repeating pattern in the image. The period determination module is further configured to determine instances of a repeating pattern in the image. The computer program modules further comprise an optimization module configured to calculate illumination values for pixels at locations within instances of the repeating pattern responsive to pixel intensities of pixels at corresponding locations in other instances of the repeating pattern. The computer program modules further comprises an image enhancement module configured to remove the illumination variation from the image responsive to the calculation of the illumination values.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
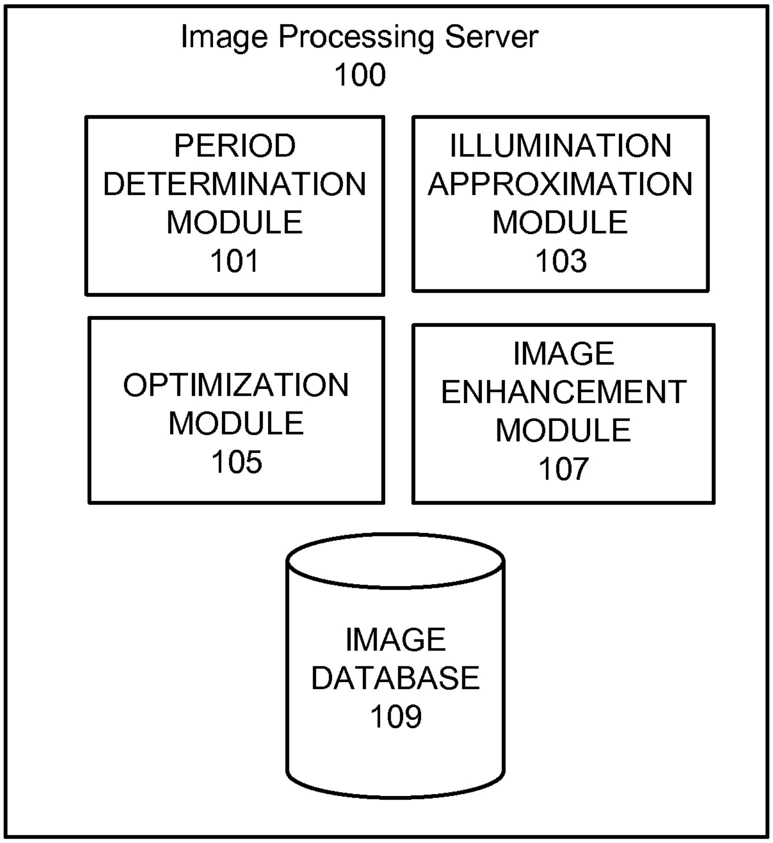
FIG. 1 is a high-level block diagram of an image processing server in accordance with one embodiment.

FIG. 1 is a high-level block diagram illustrating a detailed view of an image processing server 100 for estimating illumination values in images for illumination variation removal purposes in accordance with one embodiment. An illuminated image (i.e., an image showing a scene having ambient illumination such as shadows and reflections) is represented as an underlying non-illuminated image and an illumination map. In other words, the pixel intensity (I) of a given pixel in the illuminated image at location (i,j) is the product of the pixel intensity (R) of the pixel's underlying reflectance value (i.e., non-illuminated value) and a scalar illumination value (S), where (S) represents the value of the illumination map at location (i,j).

Note that the illumination described by the illumination map may vary across the image. For example, part of the image can be in shadow and therefore have decreased illumination relative to the remainder of the image. Under this formulation, moreover, an "illumination" can describe both a shadow where light is occluded from an object, and a bright area, such as a specular reflection, where light is reflected from an object. Shadows and reflections are simply variations in the illumination map.

Thus, this description uses the term "illumination" to encompass variations in pixel intensity (I) caused by both occlusions and reflections. An occlusion-type illumination (i.e., a shadow) can be present in an image, for example, when sunlight incident upon a building shown in the image is partially occluded by another building. Thus, the occlusion results in a portion of the building being darker than other portions. A reflection-type illumination can be present in an image, for example, when a window of a building presents a specular reflection to the camera, resulting in a bright spot in the image. Another general example of an illumination occurs when the illumination value (S) varies smoothly over an image due to gradually changing ambient lighting conditions.

Generally, the image processing server 100 estimates values of an illumination (i.e., illumination intensities) present in an image. In one embodiment, the image processing server 100 estimates the illumination values based at least in part on the periodicity of an image. The periodicity of an image is the period of a repeating pattern found in the image. An example of a repeating pattern found in an image is a repeating pattern of windows on a façade of a building. The image processing server 100 operates under the assumption that the pixel intensity for a given pixel should be equivalent to a corresponding pixel in a neighboring period. A difference in the pixel intensity of the two corresponding pixels is assumed to be caused by a variation in illumination and is used by the image processing server 100 to estimate the illumination map for the image.

In one embodiment, by comparing a known pixel intensity for a given pixel to a known pixel intensity of a corresponding pixel in a neighboring period, the image processing server 100 can estimate the illumination values that contribute to the pixel intensities. In one embodiment, the image processing server 100 enhances an illuminated image by removing illumination variation from the image based on the estimated illumination values of the pixels in the image. That is, the image processing server 100 corrects the illumination variation present in the image so that the intensity of the illumination in the image is uniform. The image processing server 100 can also detect illuminations in images based on comparisons of estimated illumination values. The image processing server 100 may also fill in missing portions of the image caused by occlusions in the image or may extrapolate illumination values onto an image to fill in missing portions of an illuminated image.

As illustrated in FIG. 1, the image processing server 100 comprises various modules. As is known in the art, the term "module" refers to computer program logic utilized to provide the specified functionality. Thus, a module can be implemented in hardware, firmware, and/or software. In one embodiment, program modules are stored on a storage device, loaded into memory, and executed by a processor or can be provided from computer program products (e.g., as computer executable instructions) that are stored in tangible computer-readable storage mediums (e.g., RAM, hard disk, or optical/magnetic media). Additionally, those of skill in the art will recognize that other embodiments of the image processing server 100 shown in FIG. 1 can have different and/or other modules than the ones described here, and that the functionalities can be distributed among the modules in a different manner.

The image database 109 stores a set of illuminated images. The term "image" as employed herein includes image data in general, such as individual still image files or frames of images from a video file. In one embodiment, the images in the image database 109 may be obtained from a variety of sources, such as from an organization producing aerial or street view images of a portion of a city for use with a map system, such as GOOGLE MAPS, STREET VIEW or GOOGLE EARTH. Likewise, images (including videos) may be obtained from users, e.g. as submitted by a user uploading images to a photo repository such as PICASA WEB, or a video repository such as YOUTUBE or GOOGLE VIDEO.

Additionally, the image database 109 stores enhanced versions of the illuminated images. In one embodiment, an enhanced version of an illuminated image comprises only the underlying non-illuminated image. That is, the image database 109 stores versions of the images with the variations in the illumination map removed, so that the illumination across the image is uniform and any shadows, reflections, other illumination-related artifacts are absent. Additionally, the image database 109 may store other enhanced images such as an image that has been enhanced to fill in missing portions of the image.

In one embodiment, at least some of the illuminated images stored in the image database 109 exhibit a repetitive pattern. For example, an image may show a façade of a building with a repeating pattern of windows or an image may show a rug that exhibits a repetitive pattern in its design.

Figure 2:
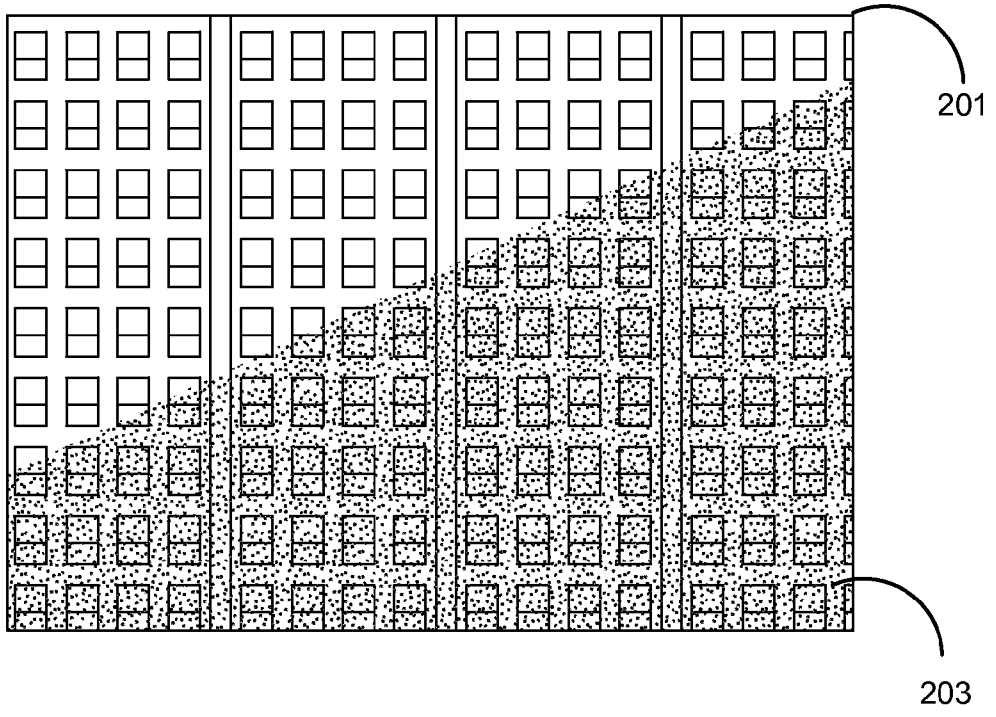
FIG. 2 illustrates an image of a building that includes an illumination in accordance with one embodiment.

The period determination module 101 analyzes an illuminated image to determine a period of a repetitive pattern within it. In one embodiment, the period determination module 101 first selects an illuminated image from the image database 109 for analysis. The selected image may include one or more repetitive patterns. However, for ease of description, the functionality of the period determination module 101 is described in reference to an image with a single repetitive pattern. Referring now to FIG. 2, there is shown an example of an image 201 selected from the image database 109 by the period determination module 101. Image 201 illustrates a façade of a building with a repetitive pattern of windows and an illumination 203 represented by the plurality of dots in the image 201. In this example, the illumination 203 represents a shadow in the image 201.

Referring back to FIG. 1, generally, by comparing an image to a shifted version of the image, the period determination module 101 determines the period of a repetitive pattern present in the image. The period describes the distance in pixels before a pattern in an image repeats in a spatial dimension, such as the x-dimension. In one embodiment, the period determination module 101 extracts the periodic structure of the image by repeatedly determining differences between pixel intensities in the image and a version of the image that is shifted in a dimension.

Figure 3A:
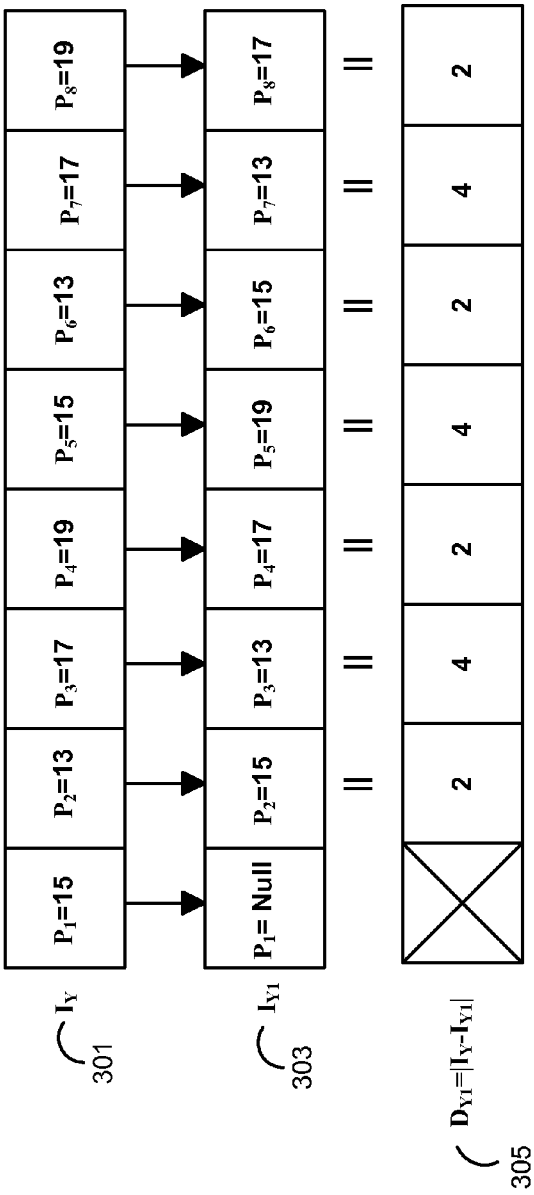
FIGS. 3A-3B illustrate a visual representation of the processes involved in the determination of a period of an image in accordance with one embodiment.

Assume dataset $I_Y$ comprises pixel intensity values for each pixel from the selected image in the x-dimension at a particular coordinate in the y-dimension (Y), where the individual pixel intensities in $I_Y$ are referred to as $P_1, P_2, P_3, \ldots P_K \ldots P_M$ where K represents the pixel location of each pixel in the image in the x-dimension and $P_K$ represents the pixel intensity at location K. M denotes the total number of pixels in a row (i.e., along the x-dimension). Referring now to FIG. 3A, there is shown an example of a dataset of pixels $I_Y$ 301. $I_Y$ 301 represents the pixel intensity of each pixel from an image in the x-dimension at a particular y-location in the image. For example, $P_1$ is associated with the first pixel in the x-dimension and has a pixel intensity of 15 whereas the second pixel in the x-dimension, $P_2$, has a pixel intensity of 13.

In one embodiment, the period determination module 101 calculates the summation of the absolute value of the differences ($D_{YN}$) between $I_Y$ and shifted values of pixel intensity ($I_{YN}$) for pixels in the x-dimension at a position Y in the y-dimension of the image. In one embodiment, the individual pixel intensities of $I_{YN}$ are referred to as $P_{1-N}$, $P_{2-N}$, $P_{3-N}$, . . . $P_{K-N}$ . . . $P_{M-N}$, where K−N represents the pixel location of each pixel in the shifted image in the x-dimension and $P_{K-N}$ represents the pixel intensity at location K−N. M−N is the total number of valid pixels in the shifted row. The summation can be represented by the following equation according to one embodiment:

$$D_{YN} = \sum_{K} |P_K - P_{K-N}|$$

In the above equation, Y represents a position or coordinate (i.e., a row) in the y-dimension and N represents the number of pixel shifts in the x-dimension relative to location (K) within the row designated by the Y-position. That is, the period determination module 101 selects a Y-coordinate along which to sum the shifted values of pixel intensity in the x-dimension. For example, a N-value of 1 represents a pixel shift of one in the x-dimension from a given pixel location in the non-shifted image whereas a N-value of 5 represents a pixel shift of five in the x-dimension from the location. For each N-value up to a threshold based on an estimation of the maximum period in the image, the period determination module 101 calculates the difference in pixel intensity for each pixel location in the original non-shifted image and the pixel intensity of a location N shifts from the location.

Referring back to FIG. 3A, dataset $I_{Y1}$ 303 represents dataset $I_Y$ 301 with a shift of one pixel (i.e., N=1). Thus, the first pixel ($P_1$) in $I_{Y1}$ 303 has a null pixel intensity value since there is no proceeding pixel in $I_Y$ 301 proceeding $P_1$. The second pixel ($P_2$) in $I_{Y1}$ 303 is equivalent to the first pixel ($P_1$) in dataset $I_Y$ 301, thus representing the shift of one pixel. Dataset $D_{Y1}$ 305 represents the absolute value of the difference of dataset $I_Y$ 301 and dataset $I_Y$ 303. That is, dataset $D_{Y1}$ 305 illustrates for each pixel instance in $I_Y$ 301, the difference between the pixel intensity of a given pixel in the dataset and the pixel intensity of a corresponding pixel in $I_{Y1}$ 303. In one embodiment, the difference between a given pixel in the dataset $I_Y$ 301 and the pixel intensity of a corresponding pixel in $I_{Y1}$ 303 with a null value is ignored as illustrated by the "X" in dataset $D_{Y1}$ 305.

Once the pixel determination module 101 has calculated the differences of pixel intensity for each pixel location for a given N-value, the pixel determination module 101 sums the pixel intensity differences in dataset ($D_{YN}$) to generate a total pixel intensity for the N-value. In the example shown in FIG. 3A, the summation of $D_{Y1}$ results in a total pixel intensity value of 20 for the difference image. The period determination module 101 performs the above process for each N-value thereby generating a total pixel intensity value for each N-value at location Y in the image. The period determination module 101 performs the process described above for generating a total pixel intensity value in the x-dimension for each y-location in the image.

In one embodiment, the period determination module 101 arranges the N-values in ascending order along with each N-value's corresponding total pixel intensity. Since the image under analysis includes a repetitive pattern, the total pixel intensity values of the difference images will repeat after a number of N-values. In one embodiment, the period determination module 101 analyzes the pixel intensity values of the difference images to determine the N-value associated with the local minimum total pixel intensity. To determine the local minimum total pixel intensity, the period determination module 101 determines the N-value associated with the first minimum total pixel intensity. Since the pixel intensity values are periodic, the first minimum total pixel intensity repeats at various instances of N. These repeating values are said to be the minimum values of the difference images.

However, due to noise and illumination variations in the original image, these values may not be equivalent at the various instances. The period determination module 101 selects as the local minimum total pixel intensity, the value associated with the smallest total pixel intensity from among all the minimum values. The N-value associated with the local minimum total pixel intensity is set as the period of the repetitive image in the x-dimension. In one embodiment, after computing the period in the x-dimension for each Y-value, the period determination module 101 determines the most common period among all Y-values as the period of the repetitive image in the x-dimension. That is, the period determination module 101 selects the x-period that occurs more frequently among all values of Y.

In an alternative embodiment, the period determination module 101 analyzes the pixel intensity differences of the difference image to determine the N-value with the first local minimum total pixel intensity value. The period determination module 101 then analyzes the pixel intensity differences to determine the N-value associated with the next local minimum total pixel intensity difference. In one embodiment, the period of the image corresponds to the number of shifts between the two N-values. Once the number of shifts between the two N-values is determined, the period determination module 101 sets the period of the repetitive image in x-dimension to the determined number of shifts.

Figure 3B:
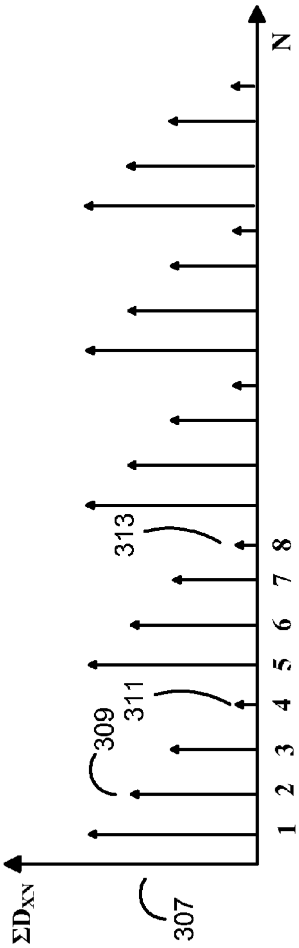

An example of the analysis performed by the period determination module 101 to determine the period of a repetitive pattern in the x-dimension is shown in FIG. 3B. Graph 307 illustrates the values of total pixel intensity, where N is represented along the x-axis and increases iteratively. For example, total pixel intensity value 309 illustrates the total pixel intensity value where N is equivalent to two. As noted above, since the image under analysis includes a repetitive pattern, the total pixel intensity values will repeat. In this example, the N-value associated with the first local minimum total pixel intensity value in graph 307 is associated with the N-value of four 311. The N-value associated with the second local minimum total pixel intensity value is associated with the N-value of eight 313. Thus, in this example, the minimum total pixel intensity values are associated with the N-values of four and eight. Assuming that the total pixel intensity value for the N-value of four is smaller than the value at the N-value of eight, the value at the N-value of four is considered the local minimum total pixel intensity value. Thus, the period of the image in the x-dimension is set to four.

Note that the functionality of the period determination module 101 described above with respect to the x-dimension can also be applied to determine the period of an image in the y-dimension. The description of the period determination module 101 was limited to the x-dimension in order to simplify the description of the period determination module 101.

Referring back to FIG. 1, in one embodiment, the illumination approximation module 103 determines mean (i.e., average) pixel intensities in regions (i.e., instances) of a illuminated image. In one embodiment, the illumination approximation module 103 applies a box filter to the illuminated image and determines the mean pixel intensity of the pixels within the box defined by the filter. The mean pixel intensity can be used as an estimate of the illumination values in the image. According to one embodiment, the size of the box filter in the x and y dimensions (e.g., 15 pixels by 17 pixels) is equivalent to the period of the repetitive pattern in the x and y dimensions for the illuminated image as determined by the period determination module 101.

In one embodiment, the box filter functions as a sliding window that moves across the image in a left-to-right, top-to-bottom order. An embodiment of the box filter moves one pixel at a time, although embodiments can increment by different amounts. The illumination approximation module 103 determines the mean pixel value within each iteration of the box according to the following equation:

$$\overline{S}_{ij} = \frac{\sum I_{xy}}{PBF} \text{ where } xy \in BF_{ij}$$

In the above equation, the illumination approximation module 103 identifies the pixel intensity (I) for each pixel location (xy) operating under the constraint that location (xy) is confined to the area in the box filter (BF) centered on location (ij). The illumination approximation module 103 calculates the sum of the pixel intensities of the pixels confined within the box and divides the sum by the number of pixels within the box (PBF). The number of pixels within the box is equivalent to the product of the period of the repetitive pattern in the x and y dimensions according to one embodiment. The resulting value is the mean pixel value ($\overline{S}_{ij}$) of the pixels within the box filter at that instance of the filter. In one embodiment, the mean pixel value of an instance of the filter is associated with the pixel located at the center of the instance of the filter (ij).

In one embodiment, the illumination approximation module 103 inverses the mean pixel value of each instance of the box filter as follows:

$$S_{ij} = \frac{1}{\overline{S}_{ij}}$$

In the above equation, ($S_{ij}$) represents the inversed mean pixel value of ($\overline{S}_{ij}$) for an instance of the box filter. To generate a plurality of inversed mean pixel values for the image, for each instance of the box filter, the illumination approximation module 103 inverses the associated mean pixel value for the given instance of the box filter ($\overline{S}_{ij}$). The resulting values are considered the inversed mean pixel values ($S_{ij}$) for the illuminated image.

Figure 4:
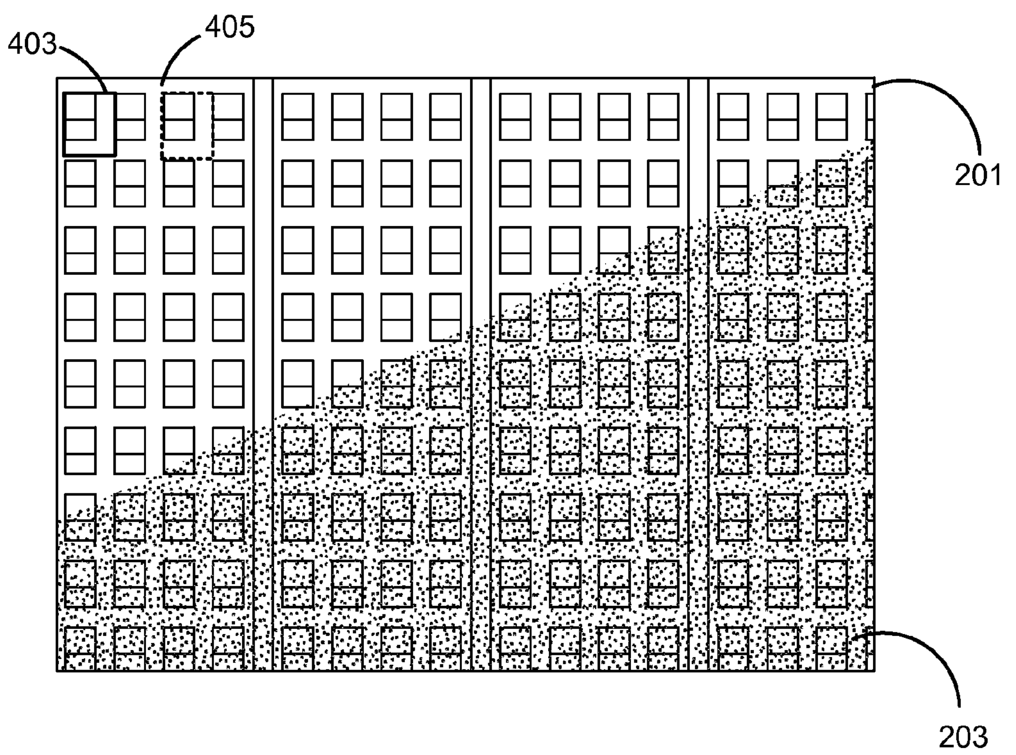
FIG. 4 illustrates one embodiment of an application of a box filter to an image of a building that includes an illumination in accordance with one embodiment.

FIG. 4, shows an example of a box filter. The box 403 represented by the solid line indicates the first position of the box filter. The illumination approximation module 103 determines an inversed mean pixel value for the pixels within the box 403 according to the techniques described above. Box 405 illustrated by the dashed line represents another position of the box filter as it iterates across the image. Note that box 405 does not necessarily represent the second position of the box filter and is merely exemplary of another position of the box filter. The illumination approximation module 103 similarly determines an inversed mean pixel intensity value for the pixels within the box 405 according to the techniques described above. This process is repeated until the illumination approximation module 103 has determined an inversed mean pixel value for each instance of the box filter in the image 201.

Referring back to FIG. 1, the optimization module 105 applies an energy function to solve for illumination values for pixels in an image. In one embodiment, the energy function is represented by the equation shown below which is subject to the constraint that the sum of the illumination values of an image is equal to one.

$$E = \sum_{mn} \sum_{ij} \left| S_{ij} I_{ij} - S_{(i+mp_x)(j+np_y)} I_{(i+mp)(j+np)} \right|^2 + \beta \sum_{ij} \sum_{xy \in N(ij)} |S_{ij} - S_{xy}|^{\alpha}$$

where $$\sum_{ij} S_{ij} = 1$$

As shown above, the energy E is a sum of two terms. The first term measures the difference between pixel intensities of periodically related pixel instances, where ($S_{ij}I_{ij}$) represents the underlying pixel intensity at a given location (ij) and ($S_{(i+mp)(j+np)}I_{(i+mp)(j+np)}$) represents the underlying pixel intensity of a corresponding pixel at a location that is a multiple of the period (p) away from the given location (ij). According to one embodiment, the period in the x-dimension ($p_x$) may be different than the period in the y-dimension ($p_y$) or they may be equivalent. In one embodiment, m and n are integers from a small negative value to a small positive value, such as negative two to positive two. These variables account for periodically-related pixels in both the x and y dimensions and adjust the number of periodic neighborhoods that are included in the energy function. Typically, the pixel intensity ($I_{ij}$) of a given pixel is known and by multiplying the pixel intensity by the inverse illumination value ($S_{ij}$) (i.e., the inverse of the illumination value in the image), which is unknown, the illumination component of the pixel intensity is removed resulting in the underlying (i.e., non-illuminated) pixel intensity at that particular location.

In one embodiment, a given pixel may not have a corresponding pixel that is a period away from the location of the given pixel in one dimension. However, these pixels typically have a corresponding pixel that is a period away in another dimension or in another direction of the dimension. For example, a given pixel at the bottom right corner of an image may not have a corresponding pixel to the right of the given pixel in the x-dimension or below in the y-dimension, but the given pixel may have a corresponding pixel above the pixel's location in the y-dimension or to the left of the location for the pixel in the x-dimension. An embodiment of the optimization module 105 accounts for the boundary of an image taking into account periodically-related pixels in different directions of the x and y dimensions.

In one embodiment, the second term of the energy function smoothes the illumination values within a region of an image. The optimization module 105 operates under the assumption that the illumination values of pixels within the region should be of equivalent or similar intensity. In the second term of the energy function, the optimization module 105 compares illumination values of neighboring pixels of a given pixel at location (ij), where (ij) is constrained within a region (N).

According to one embodiment, the region may be a 3×3 region or a 5×5 pixel region. The second term of the energy function is based on the summation of differences between the illumination value ($S_{ij}$) of the given pixel at location (ij) and the illumination values of neighboring pixel instances ($S_{xy}$) at locations (xy) within the region described by N.

Furthermore, the second term of the energy function is multiplied by a constant (β) as set by an image analyst associated with the image processing server 100. In one embodiment, (β) is a weight that controls the smoothing factor of the illumination values represented by the second term of the energy function. The second term of the energy function is also raised to a power of (α), where (α) determines how smooth the boundary is between regions with different levels of illumination. In one embodiment, different optimization techniques are used for different (α) values. According to one embodiment, (α) is less than or equal to two but can also be values greater than two. When (α) is equal to two, the boundary in the image between differently-illuminated portions of the image is smooth. In contrast, when (α) is less than two, the boundary between the portions of the image is sharper.

In one embodiment, to solve for the illumination values (S), the optimization module 105 uses the inversed mean pixel values ($S_N$) provided by the illumination approximation module 103 and normalizes these values to initialize the solution for the energy function. As previously mentioned, each inversed mean pixel value is associated with the (ij) location that corresponds to the center pixel of an instance of the box filter. The optimization module 105 solves for the illumination values of these locations using the inversed mean pixel values. The optimization module 105 then iteratively optimizes the energy function for each pixel location to solve for the illumination value that minimizes the energy function for all locations in order to improve upon the values provided by the illumination approximation module 103.

In one embodiment, the optimization module 105 applies quadratic programming techniques to solve for the illumination values if the energy function is a second order equation (i.e., $\alpha=2$). Solving the energy function using quadratic programming results in smooth changes in the illumination map for the image (e.g., smooth changes on the boundaries of shadowed and non-shadowed regions of the image). In one embodiment, if the energy function is not a second order equation (i.e., $\alpha\neq2$), the optimization module 105 applies the technique of iteratively re-weighted least squares to solve for the illumination values thereby producing sharper changes in the illumination map. Regardless of the technique used, the optimization module 105 creates a matrix, the illumination map, having illumination values (i.e., inverse illumination values) for every pixel location in the image. Each illumination value in the matrix describes the intensity of the illumination at a particular location in the image.

The image enhancement module 107 enhances images based on the optimized illumination values. In one embodiment, the image enhancement module 107 enhances an image by removing illumination variations from the image. To remove the illumination variation (i.e., correct the varying illumination in the image), the optimization module 107 multiplies the pixel intensity (I) of each pixel in the image by the optimized inverse illumination value (S) for that pixel as determined by the optimization module 105, thereby removing the value of the illumination component from the pixel. The enhanced image has uniform intensity such that any shadows, reflections, or other illumination-related artifacts are absent from the image. The image enhancement module 107 stores the enhanced image in the image database 109.

Figure 5:
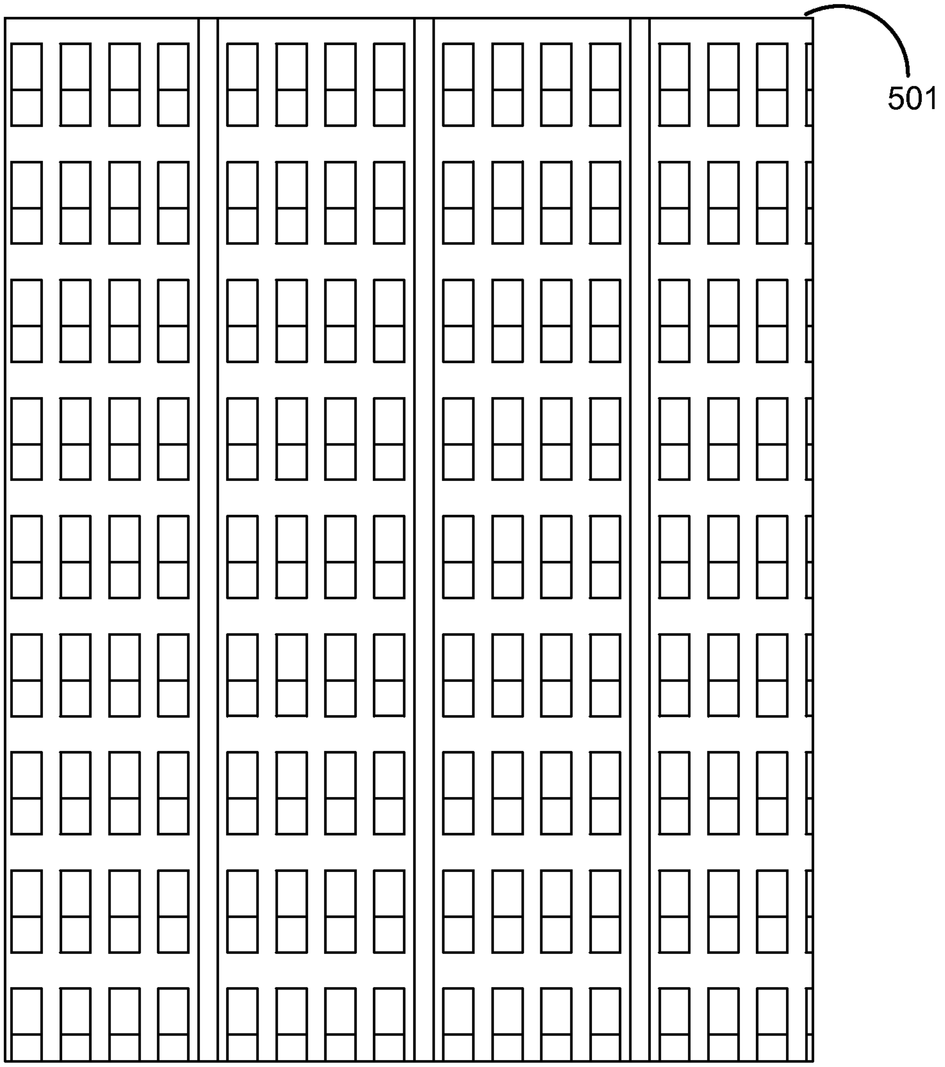
FIG. 5 illustrates the image shown in FIG. 3 with the illumination removed from the image in accordance with one embodiment.

Referring now to FIG. 5, image 501 illustrates an enhanced image of image 201 illustrated in FIG. 2. As shown in image 501, the illumination 203 from image 201 has been removed. Image 501 illustrates uniform pixel intensity of periodically-related pixels across the pattern of the image 501.

In another embodiment, to enhance an image, the image enhancement module 107 fills in any missing portions (e.g., holes or gaps) in an image produced by an occlusion in the image. For example, in an image of a façade of a building, a portion of the building may be blocked by another building. In one embodiment, the image enhancement module 107 may extrapolate the repetitive pattern of the image onto a missing portion of the image. The image enhancement module 107 may extrapolate the repetitive pattern prior to or after the illumination has been removed from the image.

Figure 6:
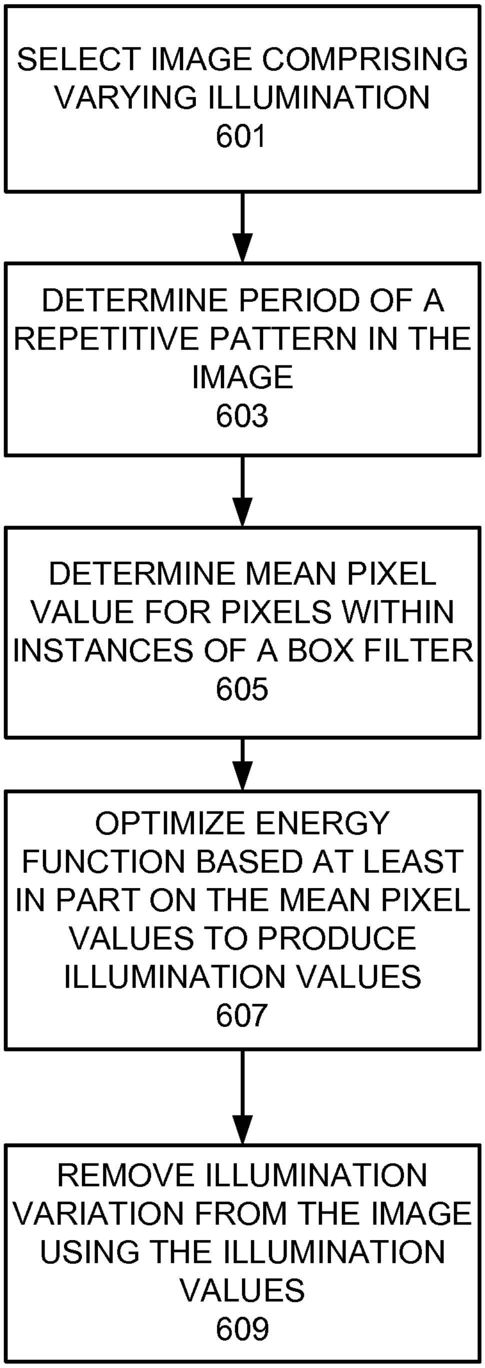
FIG. 6 is a flowchart illustrating steps performed by the image processing server to remove illumination variation from an image in accordance with one embodiment.

FIG. 6 is a flowchart illustrating steps performed by the image processing server 100 to remove illumination variation from an image. Other embodiments perform the illustrated steps in different orders, and/or perform different or additional steps.

In one embodiment, the image processing server 100 selects 601 from the image database 109 an image comprising varying illumination. The selected image also exhibits a repetitive pattern. The image processing server 100 determines 603 a period of the repetitive pattern in the image. Once the period for the repetitive pattern is determined, the image processing server 100 defines a box filter that is the size of the pattern and applies the box filter at various instances to determine 605 mean pixel values for the pixels within the instances of the box. The image processing server 100 optimizes 607 an energy function based at least in part on the determined mean pixel values to produce an inverse illumination value for each pixel in the image. The image processing server 100 removes (i.e., evens out) 609 the illumination variation from the image by multiplying the intensity of each pixel with its corresponding illumination value determined in step 607.

Figure 7:
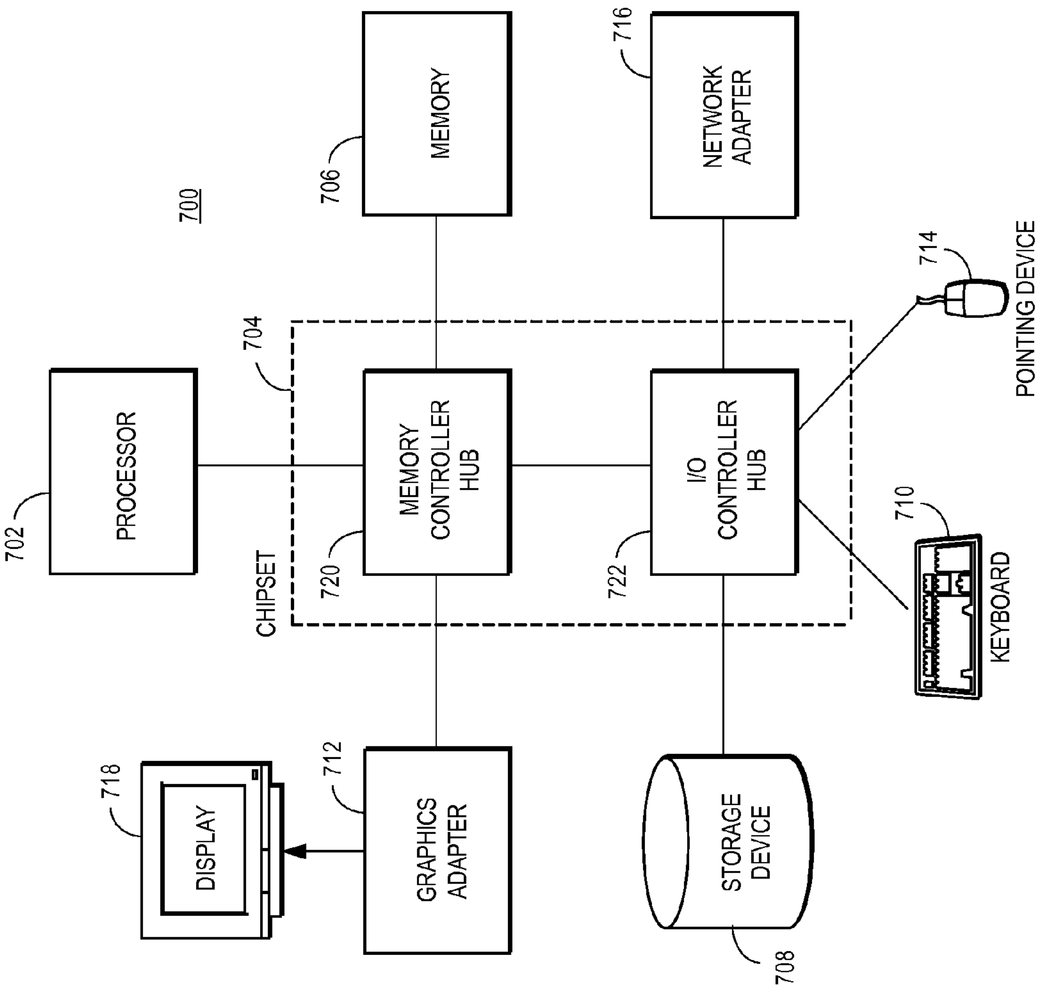
FIG. 7 is a high-level block diagram illustrating a typical computer for use as an image processing server according to one embodiment.

FIG. 7 is a high-level block diagram of a computer 700 for acting as an image processing server 100 according to one embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 206 is coupled directly to the processor 702 instead of the chipset 704.

The storage device 708 is any computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 700. The graphics adapter 712 displays images and other information on the display 718. The network adapter 716 couples the computer system 700 to a local or wide area network.

As is known in the art, a computer 700 can have different and/or other components than those shown in FIG. 7. In addition, the computer 700 can lack certain illustrated components. In one embodiment, a computer 700 acting as an image processing server 100 lacks a keyboard 710, pointing device 714, graphics adapter 712, and/or display 718. Moreover, the storage device 708 can be local and/or remote from the computer 700 (such as embodied within a storage area network (SAN)). As is known in the art, the computer 700 is adapted to execute computer program modules for providing functionality previously described herein. In one embodiment, program modules are stored on the storage device 708, loaded into the memory 706, and executed by the processor 702.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as “determining” or “displaying” or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of removing illumination variation from images comprising:

selecting, by a computer system, an image containing varying illumination, wherein the varying illumination comprises a shadow in the image;

determining, by the computer system, a plurality of instances of a pattern of pixel values in the image;

calculating, by the computer system, illumination values for pixels at locations within the plurality of instances of the pattern, an illumination value for a pixel within an instance of the pattern calculated based on a difference between a pixel intensity of the pixel within the instance of the pattern and a pixel intensity of another pixel at a corresponding location in an adjacent instance of the pattern; and removing, by the computer system, the illumination variation from the image responsive to the calculation of the illumination values.

2. The computer-implemented method of claim 1, wherein the shadow in the image is caused by an object occluding a light source.

3. The computer-implemented method of claim 1, wherein the varying illumination further comprises a reflection in the image caused from light being reflected by an object.

4. The computer-implemented method of claim 1, wherein determining the plurality of instances of the pattern comprises:

determining a period of the pattern in a dimension based on differences in pixel intensities among the image and versions of the image shifted in the dimension.

5. The computer-implemented method of claim 1, further comprising:

determining dimensions of the pattern in the image;

defining regions of pixels of the image based on the dimensions of the pattern; and determining mean pixel intensities of pixels within the defined regions of pixels;

wherein the illumination values for the pixels are determined based on the mean pixel intensities.

6. The computer-implemented method of claim 1, wherein the illumination value for the pixel within the instance of the pattern is further calculated based on illumination values of neighboring pixels of the pixel.

7. The computer-implemented method of claim 1, wherein the calculation is performed as an optimization problem and wherein a mean pixel value for a defined region of the image is used as an initial value for the optimization problem.

8. A computer program product comprising a non-transitory computer-readable storage medium storing computer-executable code for removing illumination variation from images, the code when executed performs steps comprising:

selecting an image containing varying illumination, wherein the varying illumination comprises a shadow in the image;

determining a plurality of instances of a pattern of pixel values in the image;

calculating illumination values for pixels at locations within the plurality of instances of the pattern, an illumination value for a pixel within an instance of the pattern calculated based on a difference between a pixel intensity of the pixel within the instance of the pattern and a pixel intensity of another pixel at a corresponding location in an adjacent instance of the pattern; and removing the illumination variation from the image responsive to the calculation of the illumination values.

9. The computer program product of claim 8, wherein the shadow in the image is caused by an object occluding a light source.

10. The computer program product of claim 8, wherein the varying illumination further comprises a reflection in the image caused from light being reflected by an object.

11. The computer program product of claim 8, wherein determining the plurality of instances of the pattern comprises:

determining dimensions of the pattern in the image; and defining regions of pixels of the image based on the dimensions of the pattern;

determining mean pixel intensities of pixels within the defined regions of pixels; and wherein the illumination values for the pixels are determined based on the mean pixel intensities.

12. The computer program product of claim 8, wherein the illumination value for the pixel within the instance of the pattern is further calculated based on illumination values of neighboring pixels of the pixel.

13. The computer program product of claim 8, wherein the calculation is performed as an optimization problem and wherein a mean pixel value for a defined region of the image is used as an initial value for the optimization problem.

14. A computer system for removing illumination variation from images, the system comprising:

a computer processor; and a computer-readable storage medium storing computer executable code configured to execute on the computer processor, the code when executed performs steps comprising:

selecting an image containing varying illumination, wherein the varying illumination comprises a shadow in the image;

determining a plurality of instances of a pattern of pixel values in the image;

calculating illumination values for pixels at locations within the plurality of instances of the pattern, an illumination value for a pixel within an instance of the pattern calculated based on a difference between a pixel intensity of the pixel within the instance of the pattern and a pixel intensity of another pixel at a corresponding location in an adjacent instance of the pattern; and removing the illumination variation from the image responsive to the calculation of the illumination values.

15. The system of claim 14, wherein the shadow in the image is caused by an object occluding a light source.

16. The computer system of claim 14, wherein the varying illumination further comprises a reflection in the image caused from light being reflected by an object.

17. The computer system of claim 14, wherein determining the plurality of instances of the pattern comprises:

determining dimensions of the pattern in the image; and defining regions of pixels of the image based on the dimensions of the pattern;

determining mean pixel intensities of pixels within the defined regions of pixels; and wherein the illumination values for the pixels are determined based on the mean pixel intensities.

* * * * *